US011231961B2

(12) United States Patent
Mandal et al.

(10) Patent No.: US 11,231,961 B2
(45) Date of Patent: Jan. 25, 2022

(54) SCHEDULING OPERATIONS

(71) Applicant: FUJITSU LIMITED, Kawasaki (JP)

(72) Inventors: Avradip Mandal, San Jose, CA (US);
Sarvagya Upadhyay, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 222 days.

(21) Appl. No.: 16/420,071

(22) Filed: May 22, 2019

(65) Prior Publication Data

US 2020/0371838 A1    Nov. 26, 2020

(51) Int. Cl.
     *G06F 9/46*      (2006.01)
     *G06F 9/48*      (2006.01)
     *G06F 9/50*      (2006.01)
     *G06N 20/00*      (2019.01)

(52) U.S. Cl.
CPC .......... *G06F 9/4887* (2013.01); *G06F 9/5016* (2013.01); *G06N 20/00* (2019.01)

(58) Field of Classification Search
None
See application file for complete search history.

(56) References Cited

U.S. PATENT DOCUMENTS

| 9,430,280 | B1 | 8/2016 | Shih et al. |
| 10,685,295 | B1* | 6/2020 | Ross .................. G06F 9/5016 |
| 11,003,992 | B2* | 5/2021 | Wesolowski ............ G06N 3/08 |
| 2016/0071018 | A1* | 3/2016 | Hernandez ............. G06N 5/003 |
| | | | 706/54 |
| 2018/0113742 | A1 | 4/2018 | Chung et al. |
| 2019/0332441 | A1* | 10/2019 | Fachini .................... G06N 3/04 |
| 2020/0293838 | A1* | 9/2020 | Li .......................... G06K 9/6274 |

FOREIGN PATENT DOCUMENTS

WO      2014/112739 A1      7/2014

OTHER PUBLICATIONS

EP Search Report in Application No. 20158429.9 dated Sep. 3, 2020.

(Continued)

*Primary Examiner* — Kenneth Tang
(74) *Attorney, Agent, or Firm* — Maschoff Brennan

(57) ABSTRACT

A method may include obtaining multiple operations configured to be performed in a serial fashion to implement a function. In some embodiments, each operation may be performed with respect to a parameter and an input. The method may also include obtaining an indication of multiple resources configured to perform the operations and a duration for each of the multiple resources to perform each of the multiple operations individually. The method may also include modeling, as a binary optimization, a scheduling of the resources to perform the multiple operations that reduces a total duration to perform the multiple operations based on the duration for each of the multiple resources to perform each of the multiple operations individually. The method may further include solving the binary optimization to determine a schedule of the multiple resources and performing, by the multiple resources, the multiple operations according to the schedule to implement the function.

20 Claims, 6 Drawing Sheets

(56) References Cited

OTHER PUBLICATIONS

U.S. Appl. No. 16/212,354 entitled "Scheduling Task Graph Operations", filed Dec. 6, 2018.
Mayer, Ruben, Christian Mayer, and Larissa Laich. "The tensorflow partitioning and scheduling problem: it's the critical path!." Proceedings of the 1st Workshop on Distributed Infrastructures for Deep Learning. Dec. 11, 2017.
Jia, Zhihao, et al. "Exploring Hidden Dimensions in Parallelizing Convolutional Neural Networks." arXiv preprint arXiv:1802.04924. Jun. 9, 2018.
Dean, Jeffrey, et al. "Large scale distributed deep networks." Advances in neural information processing systems. Dec. 3, 2012.
Krizhevsky, Alex, Ilya Sutskever, and Geoffrey E. Hinton. "Imagenet classification with deep convolutional neural networks." Advances in neural information processing systems. Jan. 2012.
Chen, Xie, et al. "Pipelined back-propagation for context-dependent deep neural networks." Thirteenth Annual Conference of the International Speech Communication Association. Sep. 2012.
Abadi, Martin, et al. "Tensorflow: a system for large-scale machine learning." OSDI. vol. 16. May 27, 2016.
[KA98] Kwok, Yu-Kwong, and Ishfaq Ahmad. "Benchmarking and comparison of the task graph scheduling algorithms." Journal of Parallel and Distributed Computing 59.3: 381-422. Mar. 19, 1999.

* cited by examiner

SCHEDULING OPERATIONS

The embodiments discussed in the present disclosure are related to scheduling operations.

BACKGROUND

Task graphs may represent operations and the flow of data between the operations to perform a certain task. For example, a task graph may represent operations and data flows for a machine learning algorithm to generate a machine learning model. Task graphs may be used to schedule a cluster of devices, such as a cluster of servers, which may be used to perform the operations in the task graph.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining multiple operations configured to be performed in a serial fashion to implement a function. In some embodiments, each operation may be performed with respect to a parameter and an input. The method may also include obtaining an indication of multiple resources configured to perform the operations with respect to the parameters and the inputs and a duration for each of the multiple resources to perform each of the multiple operations individually. The method may also include modeling, as a binary optimization, a scheduling of the resources to perform the multiple operations that reduces a total duration to perform the multiple operations based on the duration for each of the multiple resources to perform each of the multiple operations individually. The method may further include solving the binary optimization to determine a schedule of the multiple resources and performing, by the multiple resources, the multiple operations according to the schedule to implement the function.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
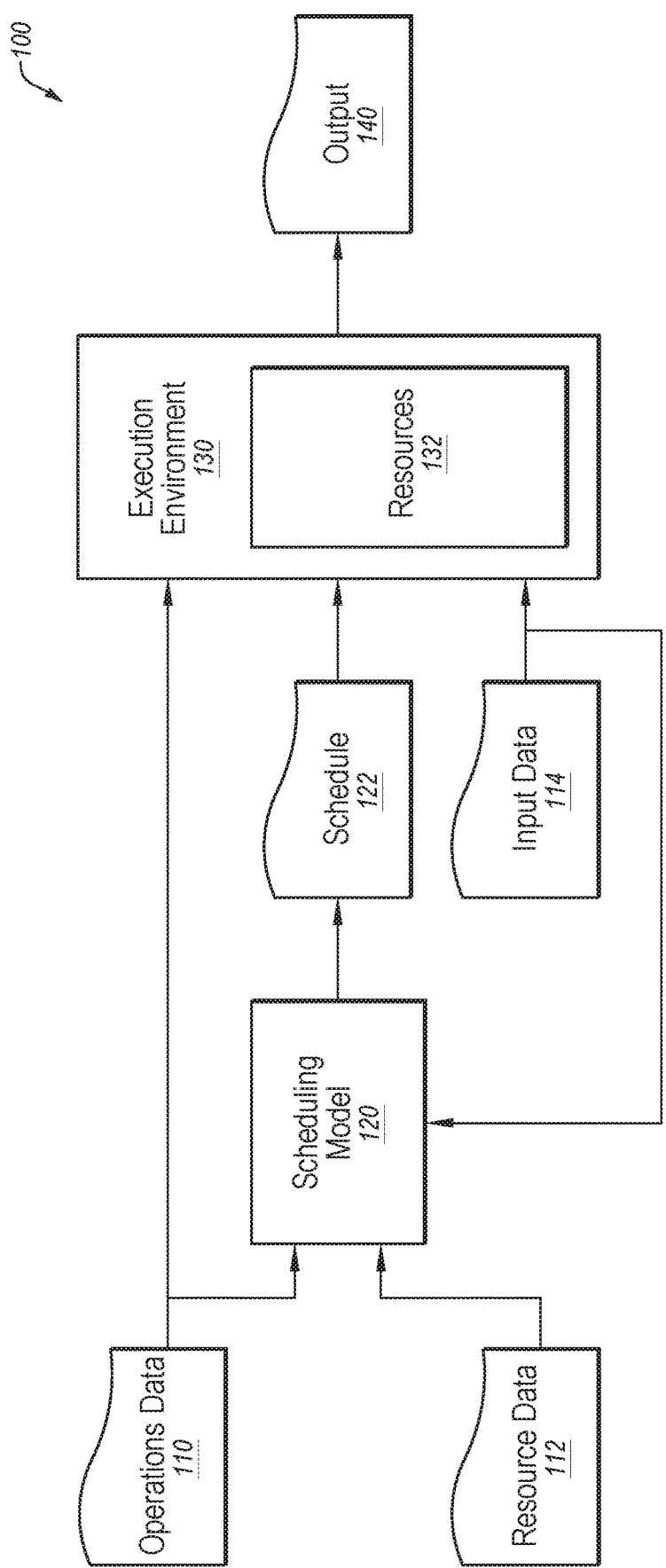
FIG. 1 is a diagram representing an example environment related to scheduling operations.

Operations performed on data are increasing. For example, machine learning algorithms, such as deep learning networks, perform millions of operations on data during training. As a result, having a single device perform the operations, in some situations, may result in the performance of the operations being slow. The systems and methods described in this disclosure may be directed to scheduling of operations across multiple different resources in a manner to decrease the time to perform the operations. In these and other embodiments, the operations may be scheduled across the resources based on the availability of the resources and the flow of the operations. Determining a schedule for resources to process operations may be a nondeterministic polynomial time (NP)-complete problem. Thus, determining a schedule that may decrease the time to perform the operations may be difficult.

One or more embodiments of the current disclosure may relate to systems and/or methods that may determine a schedule for resources to perform operations. The schedule may be determined using an indication of the operations, resources configured to perform the operations, and a duration for each of the resources to perform each of the operations individually.

In some embodiments, a schedule to perform the multiple operations that reduces a total duration to perform the multiple operations may be determined by modeling the scheduling of resources to perform the operations using a binary optimization. The binary optimization may be modeled to perform the multiple operations based on a duration for resources to perform each of the operations individually. In these and other embodiments, the quadratic constrained binary optimization may be solved to determine the schedule and the operations may be performed according to the schedule.

As such, according to one or more embodiments of the present disclosure, the operations described herein allow for an improvement in scheduling performance of operations. The improvement in scheduling performance of operations may result in better usage of resources, such as devices and/or systems, which may be performing the operations. Alternatively or additionally, the improvement in scheduling performance of operations may reduce a time for resources to perform the operations. Alternatively or additionally, the improvement in scheduling performance of operations may increase performance of resources that are performing the operations. For example, improvement in scheduling performance of operations for a machine learning algorithm may decrease latency and time for computer systems, such as servers, to train a machine learning model. Alternatively or additionally, improvement in scheduling performance of operations for a machine learning algorithm may increase a number of inputs that may be used when generating a machine learning model, such that the machine learning model may be improved. Thus, embodiments disclosed herein may solve problems in the technical field of machine learning, scheduling of resources for large operations, such as task graphs, and usage of computing system resources. Furthermore, embodiments disclosed herein may decrease processing time of and latency along computing system resources working to perform operations.

Embodiments of the present disclosure are explained with reference to the accompanying drawings.

FIG. 1 is a diagram representing an example environment 100 related to scheduling operations, arranged in accordance with at least one embodiment described in the present disclosure. The environment 100 may include a scheduling module 120 and an execution environment 130.

The scheduling module 120 and/or the execution environment 130 may include code and routines configured to enable one or more computing devices or systems to perform one or more of the operations described therewith. In these and other embodiments, the scheduling module 120 and/or the execution environment 130 may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, the scheduling module 120 and the execution environment 130 may be implemented using a combination of hardware and software. In the present disclosure, operations described as being performed by the scheduling module 120 and the execution environment 130 may include operations that the scheduling module 120 and the execution environment 130 may direct a corresponding system to perform.

In some embodiments, the environment 100 may obtain operations data 110, resource data 112, and input data 114. The operations data 110 may represent operations and the flow of data between the operations to implement a particular function. For example, the operations data 110 may represent what input and/or parameters are provided to different operations and whether the output of a first operation is provided to an output of a second operation. Alternately or additionally, the operations data 110 may indicate a serial or parallel relationship between the operations. A serial relationship may indicate that a first operation may not begin until after a second operation has completed. A parallel relationship may indicate that a first operation and a second operation may be performed in overlapping time periods. The input data 114 may represent information that may be used to perform the operations, such as one or more inputs, one or more parameters, and other data used to perform the operations that are not generated by the operations.

Figure 2A:
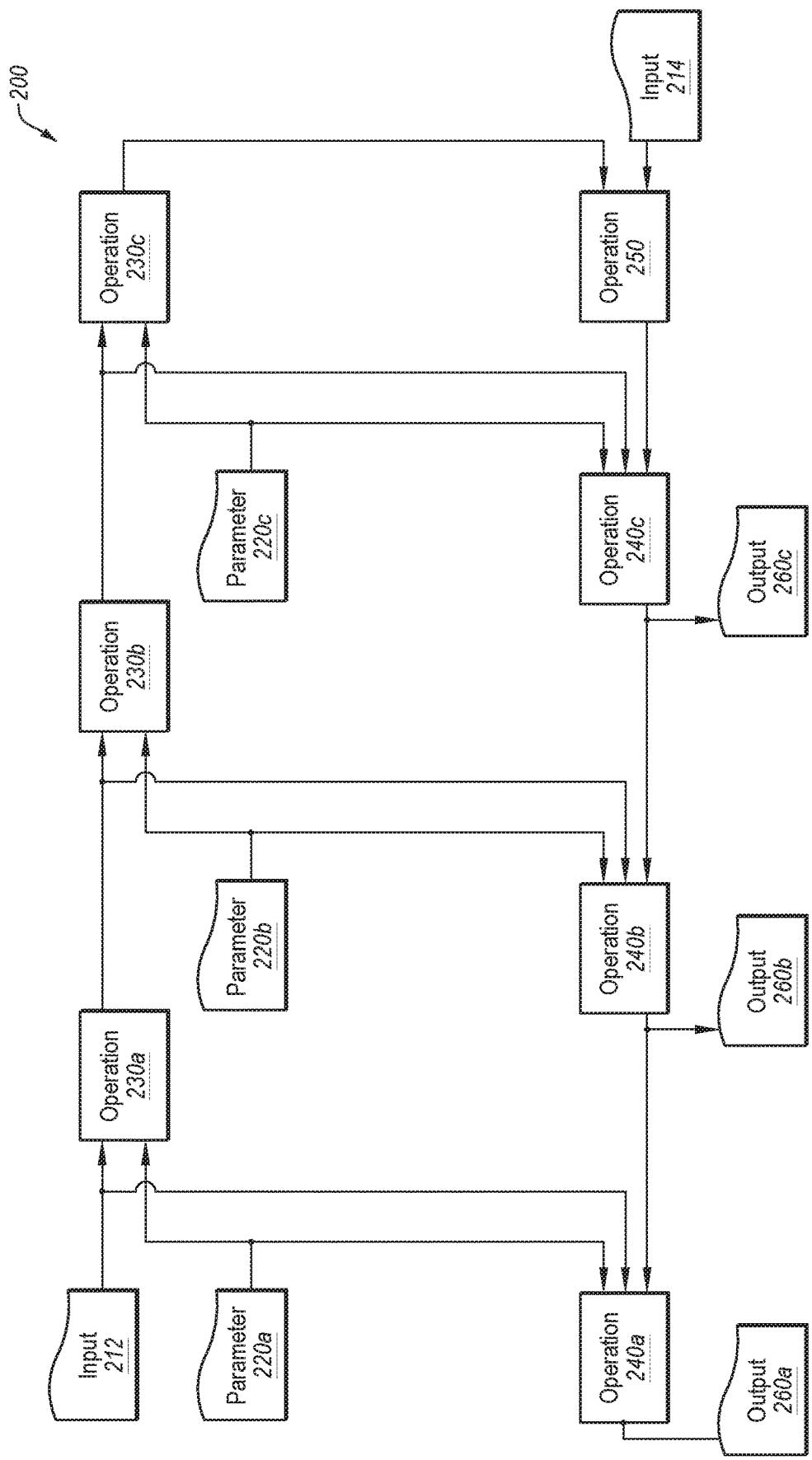
FIG. 2*a* illustrates an example operational flow.

FIG. 2a illustrates an example operational flow 200, according to at least one embodiment of the present disclosure. The operational flow 200 may illustrate an operational flow for training a machine learning algorithm. For example, the operational flow 200 may illustrate training a machine learning algorithm using a single input. In some embodiments, the operational flow 200 may represent a task graph that may be used in single input machine learning training.

The operational flow 200 may include a first input 212, a second input 214, parameters 220, including first parameter 220a, second parameter 220b, and third parameter 220c, forward operations 230, including first forward operation 230a, second forward operation 230b, and third forward operation 230c, feedback operations 240, including first feedback operation 240a, second feedback operation 240b, and third feedback operation 240c, middle operation 250, and outputs 260, including first output 260a, second output 260b, and third output 260c.

The forward operations 230 may be performed in a serial fashion. For example, the first forward operation 230a may obtain the first input 212 and the first parameter 220a and perform a first operation thereon to generate a first forward output. The second forward operation 230b may be performed after the completion of the first forward operation 230a. The second forward operation 230b may obtain the first forward output and the second parameter 220b and perform a second operation thereon to generate a second forward output. The third forward operation 230c may be performed after the completion of the second forward operation 230b.

The third forward operation 230c may obtain the second forward output and the third parameter 220c and perform a third operation thereon to generate a third forward output. The middle operation 250 may be performed after the completion of the third forward operation 230c. The middle operation 250 may obtain the third forward output and the second input 214 and perform a middle operation thereon to generate a first feedback output.

The third feedback operation 240c may be performed after the completion of the middle operation 250. The third feedback operation 240c may obtain the first feedback output, the third forward output, and the third parameter 220c and perform a fourth operation thereon to generate the third output 260c.

The second feedback operation 240b may be performed after the completion of the third feedback operation 240c. The second feedback operation 240b may obtain the third output 260c, the second forward output, and the second parameter 220b and perform a fifth operation thereon to generate the second output 260b.

The first feedback operation 240a may be performed after the completion of the second feedback operation 240b. The first feedback operation 240a may obtain the second output 260b, the first input 212, and the first parameter 220a and perform a sixth operation thereon to generate the first output 260a.

In some embodiments, the operations performed by the forward operations 230 may be analogous or similar operations. Alternately or additionally, the operations performed by the feedback operations 240 may be analogous or similar operations.

As an example, the operational flow 200 may relate to training a machine learning model to label images. In these and other embodiments, the first input 212 may be an image, the parameters 220 may be a numerical value associated with the machine learning algorithm, the second input 214 may be a label of the image, and the outputs 260 may represent a change in error over a change in parameter.

The operational flow 200 represent a flow with 6 operations. However, the operational flow 200 may include any number of operations. For example, the operational flow 200 may include N number of forward operations 230, N number of feedback operations 240, N number of parameters 220, and N number of outputs 260. Thus, the operational flow 200 may represent 2*N+1 number of operations.

Returning to a discussion of FIG. 1, in some embodiments, the operations data 110 may represent operations that are repetitive. For example, the operations data 110 may represent operations that may be used to schedule operations for a machine learning algorithm on multiple inputs. As an example, the operational flow 200 of FIG. 2a may be performed once for each of the inputs. In some embodiments, the schedule 122 determined by the scheduling module 120 may be a schedule for performing multiple of the operations flows for inputs of the machine learning algorithm using the resources 132. In these and other embodiments, the multiple operational flows that may be performed in overlapping time periods by the resources 132 may include the same configuration of operations and may not depend on each other for inputs.

For example, a processing time for one particular operational flow assuming the resources 132 are not performing other operations until the processing of the particular operational flow is finished, may be time T1. A processing time for two operational flows, assuming the resources 132 are not performing other operations until the processing of the operational flows is finished, may be time T2. However, given the configuration of the resources 132 and the nature of pipeline processing across multiple resources, T2<(2*T1). Thus, scheduling more than one operational flow for processing by the resources 132 in overlapping time periods may generate efficiencies.

As an example of performing scheduling for many operational flows in overlapping time periods, assume training of a machine learning algorithm includes M number of training images. Training for each image may include (2*N+1) number of operations as describe above with respect to FIG. 2a where N is the number of parameters to training with respect to one image. Thus, the operations to train the machine learning algorithm on M training images may be M*(2*N+1). Instead of scheduling the operations for all M training images, the environment 100 may generate a schedule for a subset of the M training image, such as K training images, where K is less than M and greater than 1. In these and other embodiments, the scheduling module 120 may generate a schedule for K training images, such that scheduling for K*(2*N+1) operations are scheduled. In these and other embodiments, the scheduling module 120 may generate a schedule for the K training images by modeling the scheduling of the K training images as a binary optimization and solving the binary optimization.

In some embodiments, the resource data 112 may represent resources 132 in the execution environment 130 that may be used to perform the operations in the operations data 110. In some embodiments, one of the resources 132 that is represented by the resource data 112 may represent a physical device configured to perform part of, all of, or multiple of the operations in the operations data 110 based on the input data 114. Using the input data 114 and operations in the operations data 110, the one of the resources 132 may generate outputs for the operations represented in the operations data 110.

In these and other embodiments, one of the resources 132 may include a computing unit. For example, the computing unit may include a central processing unit (CPU), graphics processing unit (GPU), a processor, a processor core of a multi-core processor, an FPGA, an ASIC, or other combination of hardware elements. In these and other embodiments, a single device may include multiple computing units and thus multiple resources. Alternatively or additionally, one of the resources 132 may include a device. The device may include a computing system, such as a combination of processor and memory, such as a mobile device, server, personal computer, among other devices.

Figure 2B:
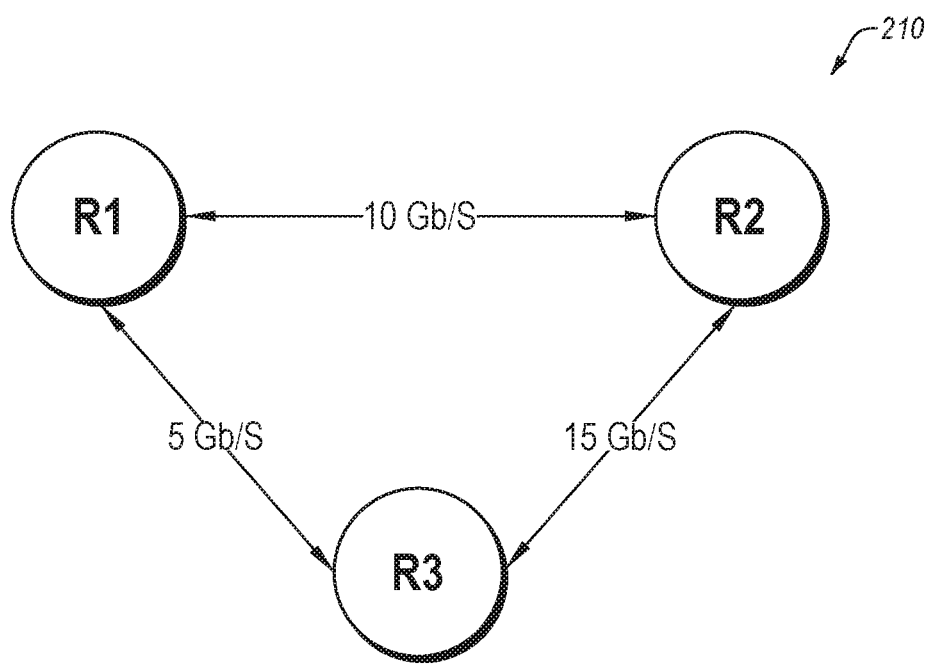
FIG. 2*b* illustrates example resources.

FIG. 2b illustrates example resources 210, according to at least one embodiment of the present disclosure. The resources 210 may be arranged in a resource graph that may include three vertices that may represent resource R1, R2, and R3. The edges between the vertices may illustrate network connections between the resource and thus which resource may communicate with other of the resource. As illustrated, each of the resource may communicate with the other resources. However, in some resource graphs, each of the resources may not be interconnected.

In some embodiments, the edges may also include information regarding the speed of the network connection between the resources. As illustrated, the network connection between the resource R1 and resource R2 may be 10 GB/s. The network connection between the resource R2 and resource R3 may be 15 GB/s and the network connection between the resource R1 and resource R3 may be 5 GB/s. As illustrated, the network connections are all different. Alternatively or additionally, each of the network connections may be the same or some of the network connections may be the same and others may be different.

Returning to a discussion of FIG. 1, in some embodiments, the resource data 112 may also include information regarding performance of operations with respect to the resources 132. For example, the resource data 112 may include information regarding a time for each of the resources 132 to perform particular operations. Alternatively or additionally, the resource data 112 may include information regarding a memory amount for each of the resources and a memory requirement for each of the resources 132 to perform particular operations.

In some embodiments, the resource data 112 may be used to determine a total processing time for particular operations. Alternatively or additionally, the resource data 112 may be used to determine scheduling of operations for processing using the resources 132. In these and other embodiments, scheduling of operations may refer to selecting resources that may perform each of the operations based on the constraints of the resources 132 and the operational flow of the operations according to the operations data 110.

For example, in some embodiments, the resource data 112 may be used to help determine which resources 132 may perform operations in an operational flow. For example, if an operation uses an amount of memory greater than the memory amount for a particular resource, the operation may not be assigned to the particular resource. Alternatively or additionally, if a particular resource is performing a particular operation that uses an amount of memory, the particular resource may not perform other operations during overlapping time intervals that may use amounts of memory that combined with the memory usage of the particular operation are greater than the memory amount of the particular resource.

As another example, in some embodiments, the resource data 112 may also be used to determine when operations that are based on outputs from other operations may begin based on operation times of the resources and network latency between the resources. For example, if a first resource performs a first operation and a second resource performs a second operation based on outputs from the first operation, the resource data 112 may be used to determine a time delay for sending the information between the first resource and the second resource and the time for the first resource to perform the first operation. Thus, the resource data 112 may be used to determine a time when the second resource may begin processing the second operation based on the time to perform the first operation by the first resource and the network connection between the first resource and the second resource.

In some embodiments, the operations data 110 and the resource data 112 may be provided to the scheduling module 120. The scheduling module 120 may be configured to determine a schedule 122 for performing the operations in the operations data 110 by the resources 132 represented in the resource data 112. The schedule 122 may indicate for each operation a starting time of the operation and which of one or more of the resources 132 may perform the operation. The schedule 122 may also provide a total processing time to process all of the operations in the operations data 110.

In some embodiments, the scheduling module 120 may be configured to determine the schedule 122 such that the schedule 122 reduces the processing time and/or minimizes the time to process all of the operations represented by the operations data 110 using the resources 132. As indicated previously, for some operations, generating a schedule for the operations and the resource data 112 may be a NPcomplete problem. Thus, generating a schedule using all of the operations may be difficult and time consuming.

In some embodiments, a schedule may be determined by solving a binary optimization, such as a quadratic constrained binary optimization. In these and other embodiments, the scheduling of the resources 132 based on the operations data 110 and the resource data 112 may be modeled as a binary optimization. After modeling of the binary optimization, the binary optimization may be solved. The solution of the binary optimization may be used to determine the schedule 122 for scheduling the resources 132.

Any known method may be used to solve the binary optimization. For example, in some embodiments, techniques may be applied to the binary optimization to convert the binary optimization to a quadratic unconstrained binary optimization. The quadratic unconstrained binary optimization may be solved using a digital annealer solver, such as a digital annealer solver offered by Fujitsu. Alternately or additionally, combinatorial optimization solvers such as Cplex, Gurobi, among others may be used to find approximate solutions to a binary optimization. Alternately or additionally, the binary optimization may be solved using heuristics such as the Tabu search or simulated annealing. Alternately or additionally, the binary optimization may be solved using constrained satisfiability (SAT) solvers, such as the SAT solvers provided in Google's OR tool.

An example regarding modeling scheduling of the operations data 110 as a binary optimization, such as a quadratic constrained binary optimization, is now provided. In some embodiments, the operations data 110 may pertain to operations associated with a single input. For example, during a machine learning training process, the operations may be associated with training for a single input and label of the input. After the single input example, an example regarding scheduling operations for multiple inputs is also provided.

In this example, assume there are m number of resources and 2N+1 number of operations where N is an integer number greater than 1. In some embodiments, N may be a number of feedback operations and/or forward operations as described with respect to FIG. 2a. In these and other embodiments, an amount of time for each operation i of the operations data 110 to complete when performed by a resource j of the resources 132 as described in the resource data 112 may be denoted by t(i,j). A time for an operation to be performed may include a time for a resource to generate an output based on received inputs. The communication time between any first resource j and any second resource k per bit may be denoted by c(j,k). Thus, for c(j,j) the communication time is 0. In these and other embodiments, the communication time may be a time delay for sending information between different resources.

In some embodiments, the size of an input used by an operation i may be denoted by I(i) and the size of a parameter used by an operation i may be denoted by P(i). The size of the input and the size of the parameter may be a size in bits of the inputs and parameters. Also the memory capacity of each resource j may be denoted by M(j).

In some embodiments, all of the operations of the operations data 110 may each be performed by one of the resources 132. Thus, if a first portion of an operation is performed by a first resource, the second portion of the operation is performed by the first resource and not by another resource. Given that each operation is performed by a single resource, a Boolean variable x may represent whether an operation i is to be performed by resource j, where x is 1 when the operation i is assigned to the resource j and 0 when the operation i is not assigned to the resource j. Given the above, the following constraint for the binary optimization may be determined:

$$\sum_{j=1}^{m} x(i, j) = \sum_{j=1}^{m} x(i, j)^2 = 1 \text{ for all } i \in [2N+1].$$

In some embodiments, this constraint may be referred to as a hot condition.

A time for completing an operation may be denoted as C(i). C(i) may be a time to complete an operation measured from a time when a first one of the operations is being executed. Thus, the time to complete a third operation as described by C(i) may not the time from the end of a second operation to the end of the third operation. Rather, the time to complete the third operation may be a time from when a first operation began to when the third operation completes. Thus, C(i) may be described based on the time to complete the operation immediate proceeding the operation i when the operations are performed in serial fashion. For example, the completion time of the second forward operation 230b of FIG. 2a may be described based on the time to complete the first forward operation 230a of FIG. 2a. C(i) may also be described based on the time for a resource j to complete the operation i and the time for the resource j to obtain the input to perform the operation i using the following equation:

$$C(i) = C(i-1) + \sum_{j=1}^{m} x(i, j)t(i, j) + \sum_{j,k=1}^{m} x(i-1, j)x(i, k)I(i)c(j, k).$$

where the first term on the right side represent the completion time of the operation previous to the operation i, the second term represents the computational time to perform the operation i by the resource j, and the third term represents the time for the resource j to obtain the inputs to perform the operation i.

A further constraint on the scheduling of operations may include the resources have sufficient memory capacity to manage the size of the inputs and the parameters. Thus, the following equation may be used as a constraint that represents that operations are not assigned to resources with insufficient memory capacity for the given operations:

$$\sum_{i=1}^{2N+1} x(i, j)(I(i) + P(i)) \le M(j) \text{ for all } j \in [m].$$

As discussed, the scheduling module 120 is configured to generate a schedule 122 that reduces a time for the execution environment 130 to execute the operations of the operations data 110. Thus, the scheduling module 120 is configured to reduce an amount of time from the beginning of the execution of the operations to the completion of the final operation. As noted above, C(i) is defined as a completion time of an operation from the start of execution of all of the operations. Thus, the scheduling module 120 may minimize the completion time of the last operation or minimize C(2N+1) where 2N+1 is the last operation. An objective function of minimizing C(2N+1) may be described as the following:

$$\sum_{i=0}^{2N}[C(2N+1-i)-C(2N-i)].$$

To model the scheduling of the operations that minimizes the time to perform the operations, the equation that defines C(i) described above may be used to replace the terms in the above equation to generate the following equation:

$$\sum_{i=0}^{2N+1}\left(\sum_{j=1}^{m}x(i,j)t(i,j)+\sum_{j,k=1}^{m}x(i-1,j)x(i,k)I(i)c(j,k)\right).$$

that is a quadratic binary optimization problem subject to the constraints discussed above, namely that an operation may only be assigned to a single resource and the single resource performs the entire operation and the resource includes the memory capacity to handle the inputs for the operation.

In some embodiments, to solve the quadratic binary optimization problem, the quadratic binary optimization problem may be converted to a quadratic unconstrained binary optimization. To convert to the quadratic binary optimization problem to a quadratic unconstrained binary optimization, the inequality constraints may be converted to an equality constraint. To convert the inequality constraints to an equality constraint, a slack variable may be introduced that penalizes the inequality constraints whenever the constraint is violated. An example of a slack variable that may be introduced to convert the inequality constraint with respect to the resource capacity of the resources 132 is provided below:

$$\sum_{i=1}^{2N+1}x(i,j)(I(i)+P(i)+y(j))\leq M(j) \text{ for all } j\in[m].$$

The slack variable may be decomposed using its binary composition. Introducing the above slack variable with the quadratic binary optimization problem discussed above and the two constraints may result in a quadratic unconstrained binary optimization. The quadratic unconstrained binary optimization may be solved as discussed above to generate the schedule 122 that reduces a time to execute the operations in the operations data 110.

In some embodiments, some of the operations that use the same inputs may be performed by the same resources. For example, as illustrated in FIG. 2a, the first forward operation 230a and the first feedback operation 240a may both use the first input 212 and the first parameter 220a. Based on this understanding, the number of variables introduced during solving of the binary optimization may be reduced based on the following:

$x(i,j)=x(2N+2-i,j)$ for all $i\in[N]$ and for all $j\in[m]$.

Discussed above is an example for scheduling operations with respect to a single input. The concepts may also be applied to scheduling operations with respect to multiple inputs as follows. The multiple inputs may each include operations that are analogous to the single input. Thus, schedule the multiple inputs may be considering scheduling n copies of the operations used for the single input. Furthermore, to reduce the complexity of the problem, the number of resources m may be larger than the number of inputs n such that a resource is available when an operation is to be schedule.

To model the scheduling of operations of n inputs, an additional variable r may be introduced that represents one of the inputs. In these and other embodiments, the Boolean indicator variable of x(i,j) may be represented as $x_r(i,j)$. The variable x may be set to one when the operation i of the input r is allocated to the resource j. Thus, the following constraint is true:

$$\sum_{j=1}^{m}x_r(i,j)=\sum_{j=1}^{m}x_r(i,j)^2=1 \text{ for all } i\in[2N+1], r\in[n].$$

In some embodiments, this constraint may be referred to as a hot condition.

As before, a time for completing an operation i of an input r may be denoted as $C_r(i)$ and expressed as follows:

$$C_r(i)=C_r(i-1)+\sum_{j=1}^{m}x_r(i,j)t(i,j)+\sum_{j,k=1}^{m}x_r(i-1,j)x_r(i,k)I(i)c(j,k).$$

where the first term on the right side represent the completion time of the operation previous to the operation i for the input r, the second term represents the computational time to perform the operation i for the input r, and the third term represents the time for the resource j to obtain the inputs to perform the operation i for the input r.

With respect to the constraints for the above equation, because a resource may perform multiple copies of the same operation, a single copy of the input and a list of parameters may be stored to execute the multiple copies. The above concept may be described as the following:

$$y(i,j)=\bigvee_{r=1}^{m}x_r(i,j) \text{ for all } i\in[2N+1], j\in[m].$$

where y(i,j) is a Boolean OR of $x_r(i,j)$.

Similar to the discuss with respect to the single input, a constraint regarding not assigning operations to resources with insufficient memory capacity may be defined as follows:

$$\sum_{i=1}^{2N+1}y(i,j)(I(i)+P(i))\leq M(j) \text{ for all } j\in[m].$$

With respect to a single input, the objective is to minimize a time for the final operations to be performed. With respect to the multiple inputs, the objective is to minimize the time to finish the operations for every one of then inputs. This objective may be described as:

$$\max_{r\in[m]}\{C_r(2N+1)\}$$

which results in a minmax higher order binary optimization when n is less than or equal to m as discussed previously. We can reduce the minmax problem above to merely a minimization problem by adding the following constraint:

$$C_n(2N+1) \geq C_{n-1}(2N+1) \geq \ldots \geq C_1(2N+1).$$

Additional auxiliary variables, such as the slack variable discussed above, may be used reduce the higher order binary optimization to a quadratic constrained binary optimization. The number of slack variables that may be introduced may be related to the number of inputs n that may be scheduled together. The quadratic constrained binary optimization may be solved as discussed above to generate the schedule 122 that reduces a time to execute the operations in the operations data 110.

The execution environment 130 may obtain the schedule 122 and the input data 114. The execution environment 130 may be configured to execute the operations of the operations data 110 using the resources 132 based on the input data 114 according to the schedule 122. The input data 114 may be data for which the operations of the operations data 110 are designed. The execution environment 130 may generate an output 140 based on the execution of the operations.

An example operation of the environment 100 is now provided. In this example, the operations data 110 may include a task graph of a machine learning algorithm for generating a machine learning model. The task graph may be generated using known software techniques, such as those used by TensorFlow and ONNX. The input data 114 may include inputs on which the machine learning model may be built. The input data 114 may further include labels for each of the inputs. For example, the inputs may be images and the labels may be a description of what is included in the image. The input data 114 may further include an initial value for parameters used by the machine learning algorithm.

The scheduling module 120 may use the operations data 110 and the resource data 112 to model the schedule as a quadratic constrained binary optimization. The scheduling module 120 may solve the quadratic constrained binary optimization to generate the schedule 122. The execution environment 130 may follow the schedule 122 and use the resources 132 with the operations data 110 and the input data 114 as input to generate a machine learning model. The machine learning model may be configured to classify unknown inputs based on the training using the input data 114. For example, the machine learning model when trained on images of animals may identify an image of an unknown animal. In these and other embodiments, using the methods and/or systems described in this disclosure may allow for larger sizes of images to be used for the machine learning models. Before the current method, larger size images may have increased the processing such that it was impractical to use in training a machine learning model. However, by scheduling as discussed in this disclosure and having the ability to use multiple resources to process an image, larger image sizes may be used to train a machine learning model.

The environment 100 may be used other purposes than for scheduling and processing of machine learning algorithms. For example, the environment 100 may be used to process deep convolutional neural networks (CNNs), recurrent neural nets (RRN), variations of CNN, RRN, fully connected networks, other deep architectures that may include recurring sub-task graphs in a task graph. As another example, the environment 100 may be used for processing computer vision applications. The computer vision applications may include operations that may be scheduled in a manner described in this disclosure.

Modifications, additions, or omissions may be made to FIG. 1 without departing from the scope of the present disclosure. For example, the environment 100 may include more or fewer elements than those illustrated and described in the present disclosure.

Figure 3:
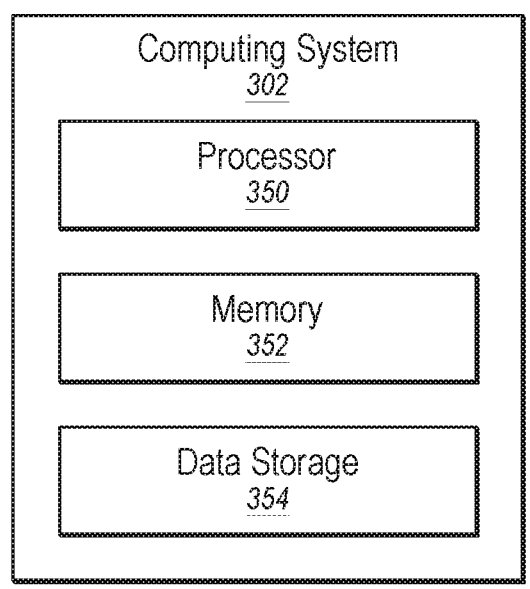
FIG. 3 illustrates an example computing system that may be configured to assist in scheduling operations.

FIG. 3 illustrates a block diagram of an example computing system 302 that may be configured to assist in scheduling operations, according to at least one embodiment of the present disclosure. The computing system 302 may be configured to implement or direct one or more operations associated with a scheduling module (e.g., the scheduling module 120 of FIG. 1) and/or an execution environment (e.g., the execution environment 130 of FIG. 1). The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

The memory 352 and the data storage 354 may include computer-readable storage media for carrying or having computer-executable instructions or data structures stored thereon. Such computer-readable storage media may include any available non-transitory media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Combinations of the above may also be included within the scope of computer-readable storage media. Computer-executable instructions may include, for example, instructions and data configured to cause the processor 350 to perform a certain operation or group of operations.

Modifications, additions, or omissions may be made to the computing system 302 without departing from the scope of the present disclosure. For example, in some embodiments, the computing system 302 may include any number of other components that may not be explicitly illustrated or described.

Figure 4:
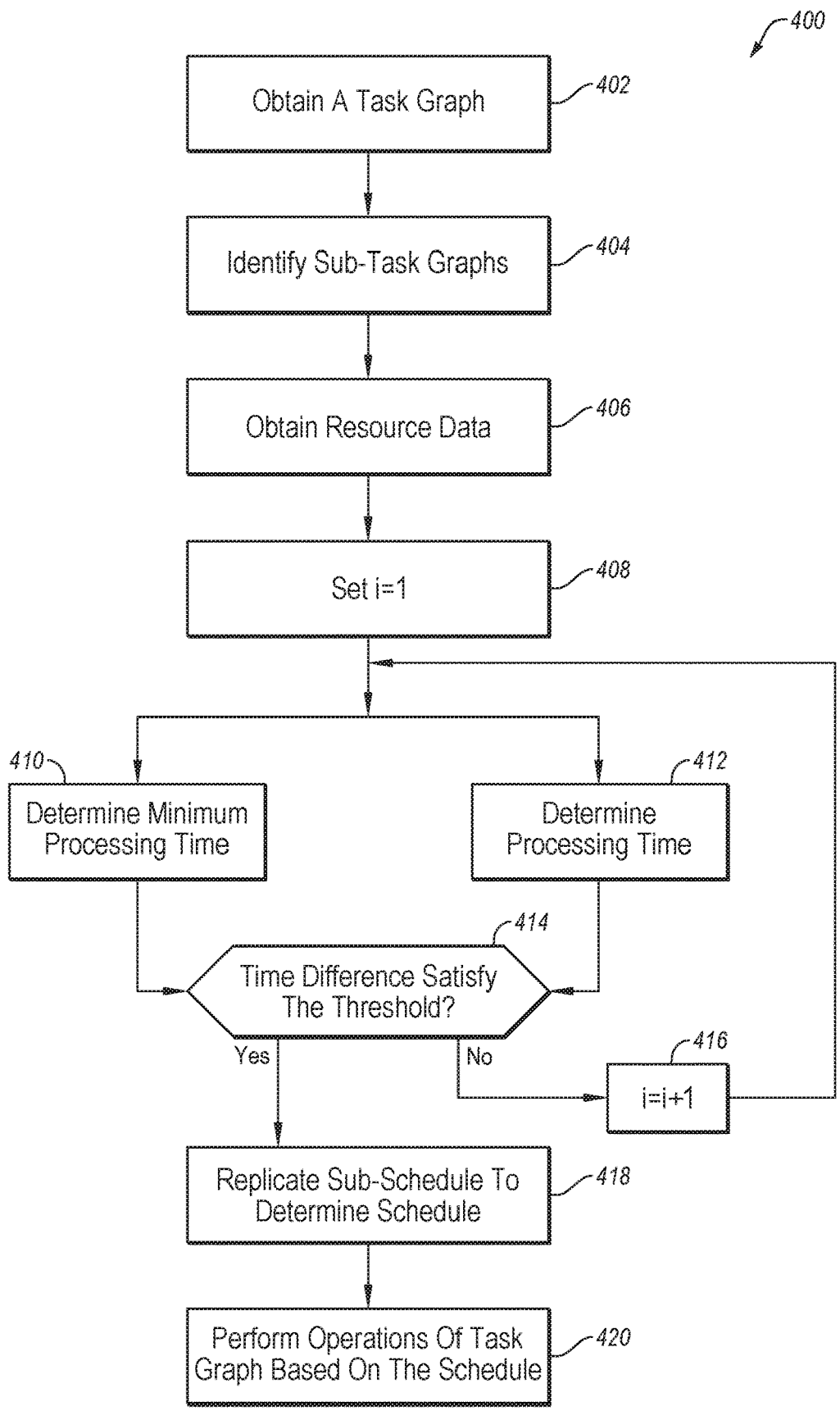
FIG. 4 is a flowchart of an example method that uses scheduling of operations.

FIG. 4 is a flowchart of an example method 400 that uses scheduling of operations, according to at least one embodiment described in the present disclosure. The method 400 may be performed by any suitable system, apparatus, or device. For example, one or more operations of the method 400 may be performed by one or more elements of the environment 100 of FIG. 1 or by the computing system 302 of FIG. 3 or multiples of the computing system 302 of FIG. 3. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a task graph may be obtained. A task graph may represent operations and the flow of data between the operations to complete a particular function. The flow of data and the arrangement of operations in a task graph may represent restrictions regarding when particular operations may begin based on the finishing of other operations. For example, a task graph may illustrate first and second operations and model a relationship between the first and second operations based on the first operation generating data that a second operation may use. As a result, the second operation may not begin until after the first operation is complete.

At block 404, sub-task graphs within the task graph may be identified. In some embodiments, recurring sub-task graphs may be identified. In these and other embodiments, a number of the recurring sub-task graphs may be determined. Alternatively or additionally, operations to be performed to allow performance of the recurring sub-task graphs may be determined. For example, the task graph may include a multi-input training task graph for training a machine learning model with respect to N number of inputs. The sub-task graphs may include a single input training task graphs for training a machine learning model with respect to one input of the N number of inputs. In these and other embodiments, the sub-task graph may include two input nodes including the input and a label for the input. The sub-task graph may also include M number of model leaf nodes for the parameters of the machine learning model, M number of output leaf nodes for the parameter weights of the machine learning model based on the input, and 2M+1 task non-leaf nodes for operations to determine the parameter weights. Each of the non-leaf nodes may represent a task in the sub-task graph.

In these and other embodiments, the task graph may include N copies of the sub-task graph followed by nodes to perform averaging of the parameter weights from each sub-task graph. As a result, the task graph may include 2N number of input leaf nodes, M number of model leaf nodes, M output lead nodes that are an average of the parameter weights from each of the N copies of the sub-task graphs, and N(2M+1) task non-leaf nodes. Each of the non-leaf nodes may represent a task in the task graph.

At block 406, resource data may be obtained. The resource data may indicate resources that may be used to perform the operations included in the task graph. The resource data may include additional information, such as processing times and memory usage for the resources when performing the operations in the task graph and a time to communicate outputs of tasks between devices.

At block 408, a counter i may be set to 1. In these and other embodiments, the counter i may be set to another integer number. For example, the counter i may be set to five, ten, twenty, thirty, or some other number. In some embodiments, the number may be selected based on factors regarding the size of the task graph.

At block 410, a minimum processing time may be determined for a sub-schedule for processing recurring sub-task graphs using the resource data based on a number of recurring sub-task graphs to be included being equal to i. In some embodiments, the sub-schedule may include a schedule of resources from the resource data to perform the operations of the number i of recurring sub-task graphs in a pipeline like fashion. The minimum processing time may be based on parallel processing of each of the operations of the i number of recurring sub-task graphs. For example, suppose that the sub-task graphs represent single input training task graphs for training a machine learning model. As a result, a minimum processing time may be determined for i number of sub-task graphs. The i number of sub-task graphs may include 2i number of input leaf nodes, M number of model leaf nodes, M number of output leaf nodes, and i(2M+1) number of non-leaf nodes. Thus, the i number of sub-task graphs may include i(2M+1) number of tasks.

The minimum processing time may be an estimate to perform the tasks of the i number of sub-task graph in parallel. For example, a minimum individual processing time for each of the i(2M+1) number of tasks may be determine when the processing is performed individually by one of the resources in the resource data. The minimum individual processing time for each of the tasks may be summed and divided by the i(2M+1) number of tasks. Note that the minimum individual processing time may be an estimation of a minimum processing time for the i number of sub-task graphs.

At block 412, a processing time may be determined for the sub-schedule for processing recurring sub-task graphs using the resource data based on a number of recurring sub-task graphs being equal to i. The processing time may be determined based on a schedule that is determined using the scheduling method discussed above with respect to FIG. 1.

For example, suppose that the sub-task graphs represent single input training task graphs for training a machine learning model. As a result, a processing time may be determined for i number of sub-task graphs. The i number of sub-task graphs may include 2i number of input leaf nodes, M number of model leaf nodes, M number of output leaf nodes, and i(2M+1) number of non-leaf nodes. Thus, the i number of sub-task graphs may include i(2M+1) number of tasks. The processing time determined may be a minimum or reduced processing time for the resources in the resource data to process the i number of sub-task graphs.

At block 414, it may be determined if a difference between the minimum processing time and the processing time satisfies a threshold. When the difference does not satisfy the threshold, the method 400 may proceed to block 416. When the difference does satisfy the threshold, the method 400 may proceed to block 418. For example, the difference between the processing time and the minimum processing time may include determining a ratio between the processing time and the minimum processing time. In response to the ratio being within the range of 0.8 to 1.2, the difference may satisfy the threshold.

At block 416, the count of i may be adjusted, such as being increased by one. In some embodiments, the count may be increased by an integer greater than one, such as two, three, five, ten, or twenty among others. Alternatively or additionally, the count may be decreased by an integer. Whether the count is increased or decreased may depend on a current value of i and a value of one or more previous changes to the count of i. The block 416 may be followed by blocks 410 and 412. The blocks 410, 412, 414, and 416 may be repeated until the difference between the minimum processing time and the processing time satisfies the threshold.

At block 418, the sub-schedule may be replicated to determine a schedule for performing the operations of the task graph. In some embodiments, the sub-schedule may be replicated by sequentially applying the sub-schedule in the schedule to schedule operations for the majority of the recurring sub-task graphs. For example, assume the task graph may include a multi-input training task graph for training a machine learning model with respect to N number of inputs. The sub-schedule may represent a schedule for the resources of the resource data to process i number of sub-task graphs of the task graph. In these and other embodiments, the sub-schedule may be performed N/i number of times and each sub-schedule may process a different one of N/i number of groups of sub-task graphs where each group of the sub-task graphs include i number of sub-task graphs. In some embodiments, the sub-schedules of the groups of sub-task graphs may be configured such that the processing of the groups of sub-task graphs may be tiled such that the processing of each group of sub-task graphs begins before the termination of processing of a directly previous group of sub-task graphs.

At block 420, the operations of the task graph may be performed according to the schedule determined in block 418 using the resources in the resource data. Additional details regarding task graphs and the operations described with respect to FIG. 4 may be found in U.S. patent application Ser. No. 16/212,354 entitled "Scheduling Task Graph Operations", filed on Dec. 6, 2018, which is incorporated herein by reference in its entirety.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For example, the method 400 may further include adjusting the resource data to provide for better tiling between the sub-schedules.

Figure 5:
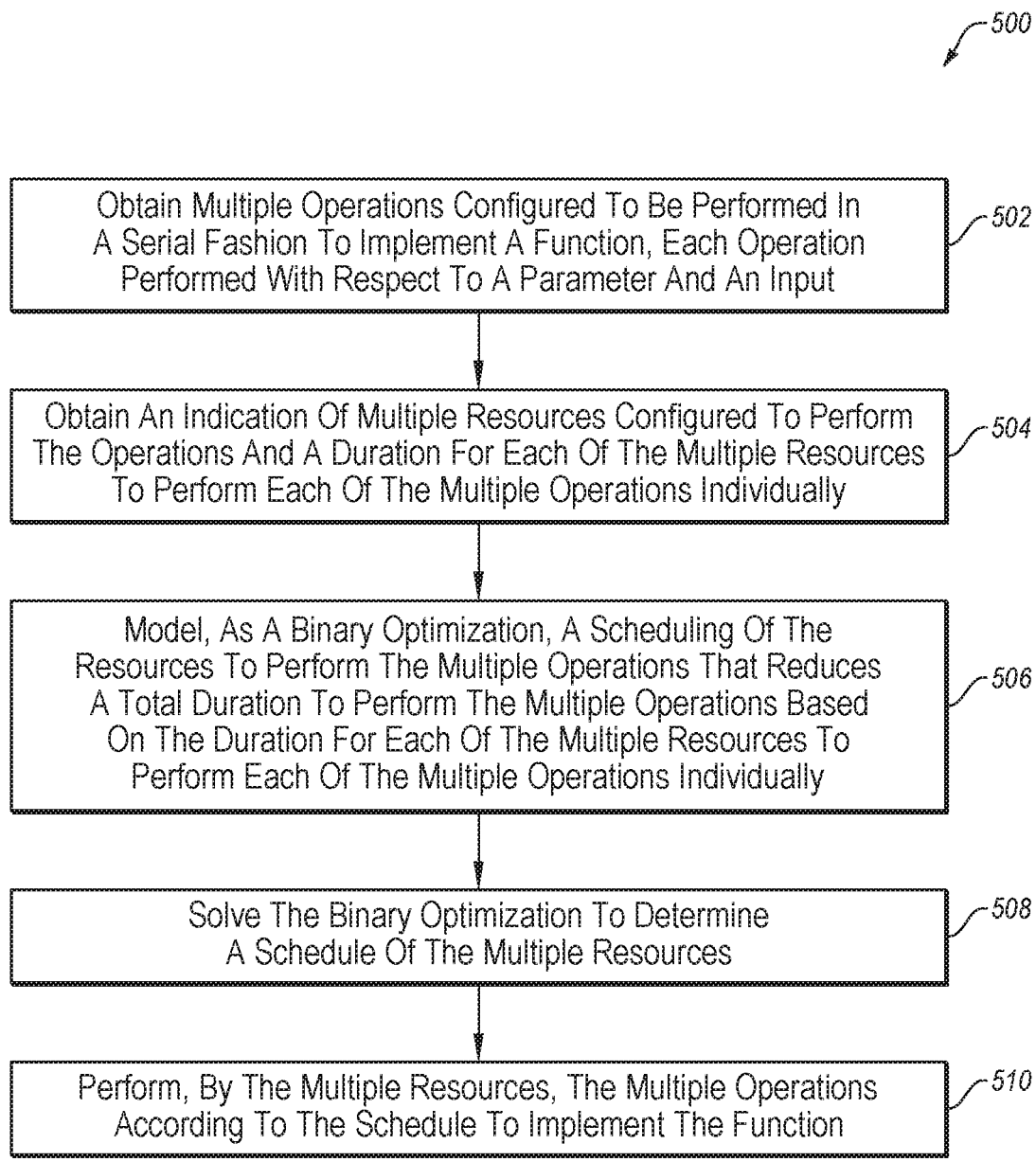
FIG. 5 is a flowchart of example method of scheduling operations.

FIG. 5 is a flowchart of another example method 500 of scheduling operations, according to at least one embodiment described in the present disclosure. The method 500 may be performed by any suitable system, apparatus, or device. For example, one or more operations of the method 500 may be performed by one or more elements of the environment 100 of FIG. 1, by the computing system 302 of FIG. 3, or multiples of the computing system 302 of FIG. 3. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where multiple operations configured to be performed in a serial fashion to implement a function may be obtained. In these and other embodiments, each operation may be performed with respect to a parameter and an input.

In some embodiments, the input for a first operation of the multiple operations may be an output of a second operation of the multiple operations. In these and other embodiments, the second operation may immediately precede the first operation in a serial performance of the multiple operations.

At block 504, an indication of multiple resources configured to perform the operations with respect to the parameters and the inputs and a duration for each of the multiple resources to perform each of the multiple operations individually may be obtained.

At block 506, a scheduling of the resources to perform the multiple operations that reduces a total duration to perform the multiple operations based on the duration for each of the multiple resources to perform each of the multiple operations individually may be modeled as a binary optimization.

modeling the scheduling of the resources as the binary optimization may include generating a binary optimization formulation that defines a completion time of a first operation of the multiple operations using a performance time to perform operations of the multiple operations positioned before the first operation and the communication delays to obtain inputs for the first operation.

modeling the schedule of the resources may include modeling that each of the multiple operations is performed by one of the resources and applying the modeling that each of the multiple operations is performed by one of the resources as a constraint while solving the binary optimization.

the multiple operations may be associated with a sub-task of multiple sub-tasks. In these and other embodiments, each of the multiple sub-tasks may be associated with different operations. In these and other embodiments, modeling the scheduling of the resources to perform the multiple operations may include modeling, as the binary optimization, the scheduling of the resources to perform the different operations for each of the multiple sub-tasks by the multiple resources. In these and other embodiments, a number of the multiple resources may be more than a number of the multiple sub-tasks.

At block 508, the binary optimization may be solved to determine a schedule of the multiple resources. At block 510, the multiple operations may be performed by the multiple resources according to the schedule to implement the function.

In some embodiments, the function implemented by the performance of the multiple operations may generate a machine learning model. In these and other embodiments, the method 500 may further include applying the machine learning model to an unclassified input to classify the unclassified input with respect to classification of the input.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, the method 500 may further include obtaining communication delays for passing information between the multiple resources. In these and other embodiments, modeling the scheduling of the resources may further be based on the communication delays.

Alternately or additionally, the method 500 may further include obtaining memory capacity associated with each of the resources and memory requirements of the parameters and memory requirements of the inputs. In these and other embodiments, modeling the schedule of the resources may include modeling memory capacity constraints associated with each of the resources with respect to each of the multiple operations based on the memory requirements of the parameters and the memory requirements of the inputs. In these and other embodiments, the modeled memory capacity constraints may be applied while solving the binary optimization.

As indicated above, the embodiments described in the present disclosure may include the use of a special purpose or general purpose computer (e.g., the processor 350 of FIG. 3) including various computer hardware or software modules, as discussed in greater detail below. Further, as indicated above, embodiments described in the present disclosure may be implemented using computer-readable media (e.g., the memory 352 or data storage 354 of FIG. 3) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
obtaining a plurality of task graphs;
obtaining, for each of the task graphs, a plurality of operations configured to be performed in a serial fashion to implement a function, each operation performed with respect to a parameter and an input;
obtaining an indication of a plurality of resources configured to perform the operations with respect to the parameters and the inputs and a duration for each of the plurality of resources to perform each of the plurality of operations individually;
selecting a subset of the plurality of task graphs that includes a first number of the plurality of task graphs;
modeling, as a binary optimization, a scheduling of the resources to perform the plurality of operations for all of the subset of the plurality of task graphs that reduces a total duration to perform the plurality of operations for all of the subset of the plurality of task graphs based on the duration for each of the plurality of resources to perform each of the plurality of operations for each of the subset of the plurality of task graphs individually;
solving the binary optimization to determine a schedule of the plurality of resources and determine a processing time to perform the plurality of operations for all of the subset of the plurality of task graphs; and
in response to determining that the processing time satisfies a particular schedule timing, performing, by the plurality of resources, the plurality of operations for all of the subset of the plurality of task graphs according to the schedule to implement the functions instead of when the processing time does not satisfy the particular schedule timing selecting a second subset of the plurality of task graphs that includes a second number of the plurality of task graphs and performing the modeling and the solving steps with respect to the second subset of the plurality of task graphs, where the first number of the plurality of task graphs is different than the second number of the plurality of task graphs.

2. The method of claim 1, further comprising obtaining communication delays for passing information between the plurality of resources, wherein modeling the scheduling of the resources is further based on the communication delays.

3. The method of claim 2, further comprising obtaining memory capacity associated with each of the resources and memory requirements of the parameters and memory requirements of the inputs,
   wherein modeling the scheduling of the resources includes modeling memory capacity constraints associated with each of the resources with respect to each of the plurality of operations for each of the subset of the plurality of task graphs based on the memory requirements of the parameters and the memory requirements of the inputs, the modeled memory capacity constraints applied while solving the binary optimization.

4. The method of claim 3, wherein modeling the scheduling of the resources as the binary optimization includes generating a binary optimization formulation that defines a completion time of a first operation using a performance time to perform operations positioned before the first operation and the communication delays to obtain inputs for the first operation.

5. The method of claim 1, wherein the input for a first operation is an output of a second operation, the second operation immediately preceding the first operation in a serial performance of the plurality of operations.

6. The method of claim 1, wherein modeling the scheduling of the resources includes modeling that each of the plurality of operations for each of the subset of the plurality of task graphs is performed by one of the resources and applying the modeling that each of the plurality of operations for each of the subset of the plurality of task graphs is performed by one of the resources as a constraint while solving the binary optimization.

7. The method of claim 1, wherein the first number of the plurality of task graphs is such that the schedule of the plurality of resources includes performance of the plurality of operations for each of the subset of the plurality of task graphs in a pipe like fashion,
   wherein determining that the processing time satisfies the particular schedule timing includes:
      determining a minimum processing time to perform the plurality of operations for all of the subset of the plurality of task graphs where the plurality of operations for each of the subset of the plurality of task graphs is performed in a parallel fashion;
      determining a difference between the minimum processing time and the processing time; and
      comparing the difference to a threshold time, wherein the processing time satisfies a particular schedule timing in response to the difference satisfying the threshold time.

8. The method of claim 1, further comprising using the schedule to perform the plurality of operations for other subsets of the plurality of task graphs that include the first number of the plurality of task graphs.

9. The method of claim 1, wherein each of the plurality of task graphs are a sub-task graph of a primary task graph and the plurality of operations for each of the sub-task graphs are the same.

10. The method of claim 1, wherein the function implemented by the performance of the plurality of operations for each of the subset of the plurality of task graphs generates a machine learning model, the method further comprising applying the machine learning model to an unclassified input to classify the unclassified input with respect to classification of the input.

11. One or more computer-readable media configured to store instructions that when executed by a system cause or direct the system to perform actions, the actions comprising:
   obtain a plurality of task graphs;
   obtain, for each of the task graphs, a plurality of operations configured to be performed in a serial fashion to implement a function, each operation performed with respect to a parameter and an input;
   obtain an indication of a plurality of resources in the system configured to perform the operations with respect to the parameters and the inputs and a duration for each of the plurality of resources to perform each of the plurality of operations individually;
   select a subset of the plurality of task graphs that includes a first number of the plurality of task graphs;
   model, as a binary optimization, a scheduling of the resources to perform the plurality of operations for all of the subset of the plurality of task graphs that reduces a total duration to perform the plurality of operations for all of the subset of the plurality of task graphs based on the duration for each of the plurality of resources to perform each of the plurality of operations for each of the subset of the plurality of task graphs individually;
   solve the binary optimization to determine a schedule of the plurality of resources of the system and determine a processing time to perform the plurality of operations for all of the subset of the plurality of task graphs; and
   in response to determining that the processing time satisfies a particular schedule timing, perform, by the plurality of resources of the system, the plurality of operations for all of the subset of the plurality of task graphs according to the schedule to implement the functions instead of when the processing time does not satisfy the particular schedule timing selecting a second subset of the plurality of task graphs that includes a second number of the plurality of task graphs and performing the modeling and the solving steps with respect to the second subset of the plurality of task graphs, where the first number of the plurality of task graphs is different than the second number of the plurality of task graphs.

12. The computer-readable media of claim 11, wherein the actions further comprise obtain communication delays for passing information between the plurality of resources, wherein modeling the scheduling of the resources is further based on the communication delays.

13. The computer-readable media of claim 12, wherein the actions further comprise obtain memory capacity associated with each of the resources and memory requirements of the parameters and memory requirements of the inputs,
   wherein modeling the scheduling of the resources includes modeling memory capacity constraints associated with each of the resources with respect to each of the plurality of operations for each of the subset of the plurality of task graphs based on the memory requirements of the parameters and the memory requirements of the inputs, the modeled memory capacity constraints applied while solving the binary optimization.

14. The computer-readable media of claim 13, wherein modeling the scheduling of the resources as the binary optimization includes generating a binary optimization formulation that defines a completion time of a first operation using a performance time to perform operations positioned before the first operation and on the communication delays to obtain inputs for the first operation.

15. The computer-readable media of claim 11, wherein the input for a first operation is an output of a second operation, the second operation immediately preceding the first operation in a serial performance of the plurality of operations.

16. The computer-readable media of claim 11, wherein modeling the scheduling of the resources includes modeling that each of the plurality of operations for each of the subset of the plurality of task graphs is performed by one of the resources and applying the modeling that each of the plurality of operations for each of the subset of the plurality of task graphs is performed by one of the resources as a constraint while solving the binary optimization.

17. The computer-readable media of claim 11, wherein
the first number of the plurality of task graphs is such that the schedule of the plurality of resources includes performance of the plurality of operations for each of the subset of the plurality of task graphs in a pipe like fashion,
wherein determining that the processing time satisfies the particular schedule timing includes:
determining a minimum processing time to perform the plurality of operations for all of the subset of the plurality of task graphs where the plurality of operations for each of the subset of the plurality of task graphs is performed in a parallel fashion;
determining a difference between the minimum processing time and the processing time; and
comparing the difference to a threshold time, wherein the processing time satisfies a particular schedule timing in response to the difference satisfying the threshold time.

18. The computer-readable media of claim 11, further comprising using the schedule to perform the plurality of operations for other subsets of the plurality of task graphs that include the first number of the plurality of task graphs.

19. The computer-readable media of claim 11, wherein each of the plurality of task graphs are a sub-task graph of a primary task graph and the plurality of operations for each of the sub-task graphs are the same.

20. The computer-readable media of claim 11, wherein the function implemented by the performance of the plurality of operations for each of the subset of the plurality of task graphs generates a machine learning model, the actions further comprising apply the machine learning model to an unclassified input to classify the unclassified input with respect to classification of the input.

* * * * *